US010620168B2

(12) United States Patent
Smith

(10) Patent No.: US 10,620,168 B2
(45) Date of Patent: Apr. 14, 2020

(54) METHOD AND SYSTEM FOR NON-DESTRUCTIVE TESTING OF COMPOSITES

(71) Applicant: The Boeing Company, Chicago, IL (US)

(72) Inventor: Nathan R. Smith, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 453 days.

(21) Appl. No.: 15/056,261

(22) Filed: Feb. 29, 2016

(65) Prior Publication Data

US 2017/0248549 A1  Aug. 31, 2017

(51) Int. Cl.

| G01N 29/36 | (2006.01) |
|---|---|
| G01N 29/42 | (2006.01) |
| G01N 29/11 | (2006.01) |
| G01N 29/34 | (2006.01) |
| G01N 29/40 | (2006.01) |

(52) U.S. Cl.
CPC ............. *G01N 29/36* (2013.01); *G01N 29/11* (2013.01); *G01N 29/348* (2013.01); *G01N 29/40* (2013.01); *G01N 29/42* (2013.01); *G01N 2291/015* (2013.01); *G01N 2291/0231* (2013.01)

(58) Field of Classification Search
CPC ....................................................... G01N 29/04
See application file for complete search history.

(56) References Cited

U.S. PATENT DOCUMENTS

| 4,462,082 A | 7/1984 | Thiele et al. |
| 4,545,251 A | 10/1985 | Uchida et al. |
| 5,146,289 A | 9/1992 | Newman |
| 6,751,342 B2 | 6/2004 | Shepard |
| 7,075,084 B2 | 7/2006 | Thompson et al. |
| 7,119,338 B2 | 10/2006 | Thompson et al. |

(Continued)

FOREIGN PATENT DOCUMENTS

WO  2010/103098  9/2010

OTHER PUBLICATIONS

PCT, "International Search Report and Written Opinion", Patent Application No. PCT/SG2011/000196, 14 pages (dated Aug. 8, 2011).

(Continued)

*Primary Examiner* — Yu-Hsi D Sun
(74) *Attorney, Agent, or Firm* — Vivacqua Law, PLLC

(57) ABSTRACT

A system for nondestructive testing of a composite includes a emitter that transmits a plurality of sound signals to a composite at over a range of frequencies and receives sound signals from the composite, and generates electric signals in response to the received signals; a computer control for receiving the electric signals from the emitter, wherein the computer control programmed to apply a different, preset gain setting to at least one of the plurality of frequencies for a selected display image such that the display image shows a plot of received signal amplitude for the plurality of frequencies that is at least partially flattened, so that the amplitude of the signal from material without defects is the same at all frequencies, and changes in the amplitude of the signal are visually perceptible on the display for all of the plurality of signals.

20 Claims, 5 Drawing Sheets

(56) References Cited

U.S. PATENT DOCUMENTS

| | | | |
|---|---|---|---|
| 7,186,981 B2 | 3/2007 | Shepard et al. | |
| 7,220,966 B2 | 5/2007 | Saito et al. | |
| 7,246,522 B1* | 7/2007 | Diaz | G01N 29/07 73/52 |
| 7,287,902 B2 | 10/2007 | Safai et al. | |
| 7,312,454 B2 | 12/2007 | Safai et al. | |
| 7,553,070 B2 | 6/2009 | Kollgaard et al. | |
| 7,699,521 B2 | 4/2010 | Shepard | |
| 7,724,925 B2 | 5/2010 | Shepard | |
| 7,819,008 B2 | 10/2010 | Winter et al. | |
| 8,167,482 B2 | 5/2012 | Hatcher | |
| 8,204,294 B2 | 6/2012 | Aloo et al. | |
| 8,289,372 B2 | 10/2012 | Hamrelius et al. | |
| 8,338,787 B1 | 12/2012 | Shelley, Jr. et al. | |
| 8,449,176 B2 | 5/2013 | Shepard | |
| 8,498,836 B2 | 7/2013 | Carlson | |
| 8,499,632 B1 | 8/2013 | Ihn et al. | |
| 8,834,376 B2 | 9/2014 | Stergiopoulos et al. | |
| 8,853,634 B2 | 10/2014 | Shelley, Jr. et al. | |
| 8,981,771 B2 | 3/2015 | Thompson | |
| 2004/0011132 A1 | 1/2004 | Netzel | |
| 2005/0268720 A1 | 12/2005 | Quarry | |
| 2006/0043303 A1 | 3/2006 | Safai et al. | |
| 2007/0056374 A1 | 3/2007 | Andrews | |
| 2007/0084290 A1 | 4/2007 | Fetzer et al. | |
| 2007/0148999 A1 | 6/2007 | Haider et al. | |
| 2012/0219034 A1 | 8/2012 | Nielson | |
| 2013/0338941 A1* | 12/2013 | Lin | G01N 29/348 702/39 |

OTHER PUBLICATIONS

PCT, "International Preliminary Report on Patentability", Patent Application No. PCT/SG2011/000196, 10 pages (dated Jul. 2, 2013).

US, "System and Method for Automated Bond Testing", U.S. Appl. No. 14/985,646, 22 pages, (filed Dec. 31, 2015).

US, "Detecting and Displaying Flaws in a Device Under Test", U.S. Appl. No. 15/002,162, 29 pages, (filed Jan. 20, 2016).

US, "Detecting Inclusions and Disbonds in Green Material Repairs With Thermography", U.S. Appl. No. 14/961,494, 40 pages, (filed Dec. 7, 2015).

US, "Infrared Thermographic Methods for Wrinkle Characterization in Composite Structures", U.S. Appl. No. 15/004,119, 47 pages, (filed Jan. 22, 2016).

US, "Infrared Thermographic Porosity Quantification in Composite Structures", U.S. Appl. No. 14/961,419, 16 pages, (filed Dec. 7, 2015).

US, "System and Method for High Speed FOD Detection", U.S. Appl. No. 14/614,198, 28 pages, (filed Feb. 4, 2015).

U.S. Non-Final Office Action, U.S. Appl. No. 13/977,319 (dated Feb. 5, 2016).

Roach, Dennis, "Assessing conventional and advanced NDI for composite aircraft"; High-Performance Composites, pp. 1-5 (Jun. 30, 2008).

Zurn et al., "Pitch catch ultrasonic bond sensor for the in-situ tow placement consolidation of thermoplastic laminates", Proc. SPIE 3589, Process Control and Sensors for Manufacturing II, 149, pp. 1-7 (Feb. 4, 1999).

"Maus V Automated System", NDT Solutions, Inc., http://www.ndts.com/products/maus/maus-v/, pp. 1-3 (Internet Archive Wayback Machine first use date Nov. 30, 2012).

EPOCH 650 Ultrasonic Flaw Detector Getting Started Guide; Olympus Scientific Solutions Americas Corp., www.olympus-ims.com; 12 pages (Feb. 2015).

EPOCH 650 Versatile and Rugged Flaw Detector; Olympus Scientific Solutions Americas Corp., www.olympus-ims.com; 8 pages (2015).

Conventional UT and Phased Array Flaw Detector—OmniScan MXU-M-Manual Inspection Solution; Olympus NDT Inc., www.olympus-ims.com; 4 pages (2010).

OmniScan MX with ECA/ECT Modules—Discover Eddy Current Color Imaging; Olympus NDT Inc., www.olympus-ims.com; 12 pages (2013).

* cited by examiner

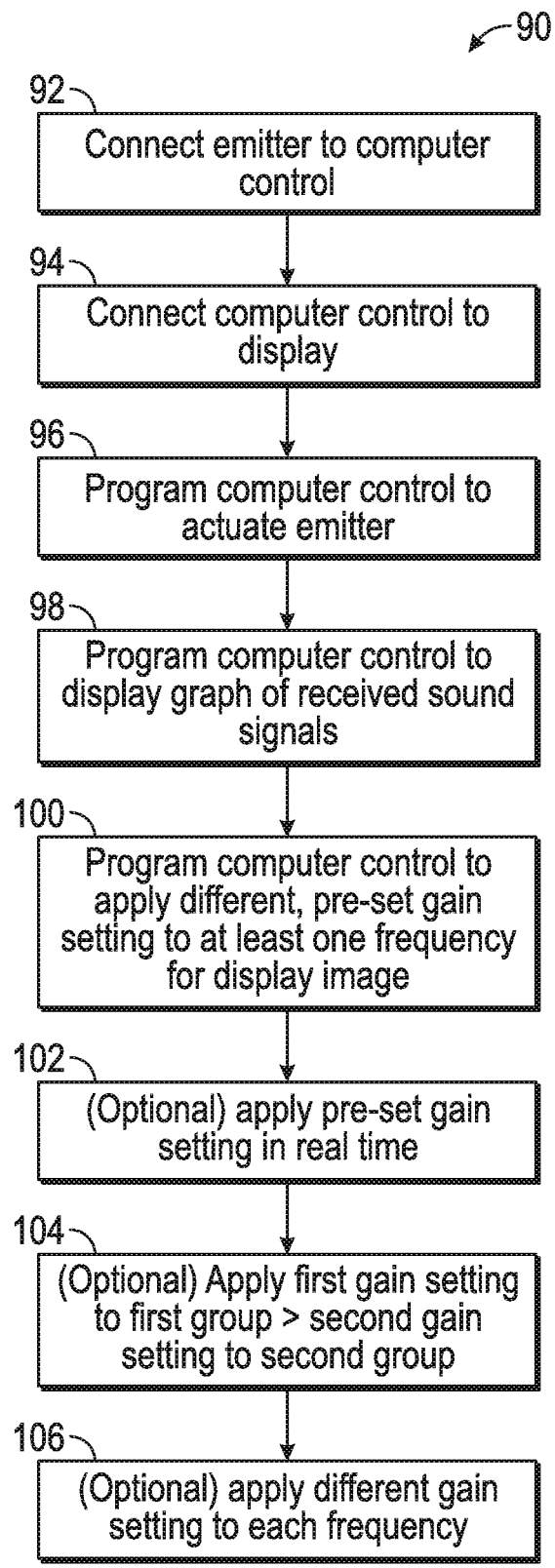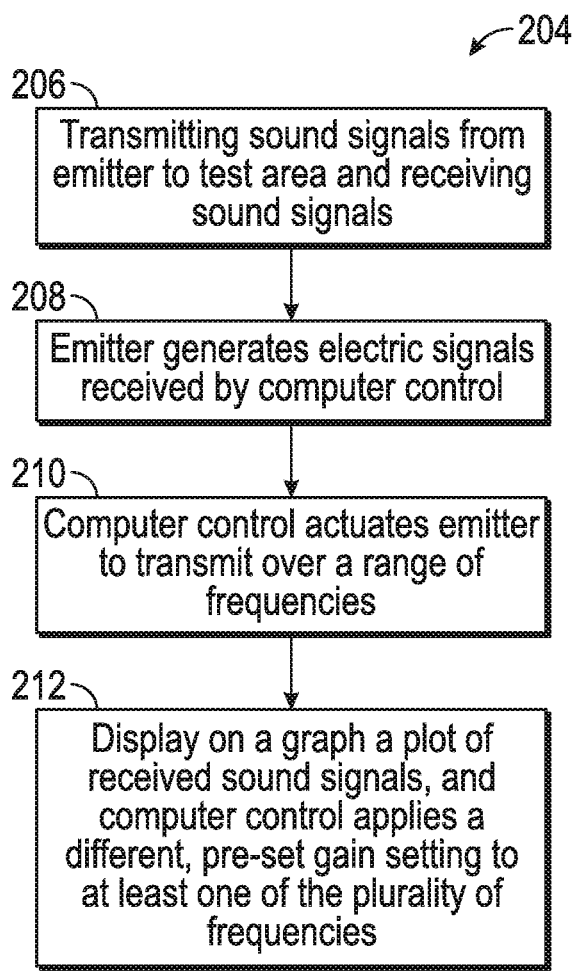
FIG. 8
FIG. 9

METHOD AND SYSTEM FOR NON-DESTRUCTIVE TESTING OF COMPOSITES

TECHNICAL FIELD

The present disclosure is directed to non-destructive testing methods and systems, and more particularly, to methods and systems for testing of the bond between the components of a honeycomb sandwich structure.

BACKGROUND

Composite materials, such as fiber-reinforced composite materials, have become popular as a constituent of high-performance products and components that need to be lightweight, yet strong enough to take harsh loading conditions. Examples of such applications are aerospace components, including the tails, wings, fuselages, and propellers of aircraft; boats and other marine vessels; bicycle frames; and car bodies. Modern jet aircraft include fuselages composed largely of composites. Carbon fiber-reinforced polymers (CFRPs) are used in the fuselages of aircraft and space vehicles.

One type of composite material is a lay-up comprised of a honeycomb core sandwiched between two outer skin layers above and below the honeycomb core. The entire sandwich may be made of a material such as fiberglass, a CFRP, aluminum, Nomex (a trademark of E. I. Du Pont De Nemours and Company, Wilmington, Del.), or other materials. Further forms of composites may include foam cores.

The use of such composite materials in high-stress areas of vehicles, such as aircraft, necessitate that the materials in such stress areas be tested periodically to determine whether damage has been sustained, because damage may occur without being visibly apparent on the outer skin of the laminate sandwich. Damage may take the form of disbonding, that is, a separation between the core and the outer skin, and a crushed core. It is desirable to test the composite structure in situ for efficiency reasons, and further, to conduct tests of the material without invasive measures such as scraping or drilling of holes.

Consequently, non-destructive testing systems have been developed. One such system, disclosed in Published U.S. Patent Application Pub. No. 2013/0338941 titled METHOD AND APPARATUS FOR DEFECT DETECTION IN COMPOSITE STRUCTURES by Lin et al., the contents of which are incorporated herein by reference, discloses a method and apparatus for defect detection in composite structures. That system and method utilize a "pitch-catch" probe connected to a control box that is controlled by a laptop computer or other computing device. The pitch-catch probe includes two transducers, which may take the form of probe tips spaced approximately one-half inch apart: a first transducer that transmits a sound signal, which may be sonic or ultrasonic, to and through the surface of the composite material to be tested, and a second transducer that receives the sound or sound signal that has traveled through the part. Changes in the structure of the part (such as defects) change how the sound travels through the part and can be detected by examining the amplitude, phase, and frequency of the received waveform. The alteration of the frequency, phase, and amplitude of the sound signal is processed by the control box to determine the presence of a defect. Variations in the received sound signal may be matched with a library of known signals for that particular composite material being tested, so that the received signal can be used to determine a type of defect in the composite material.

Traditionally, pitch-catch probes have been driven at a single frequency. However, it is known that different flaws are detected better when using different sound frequencies, but different flaw configurations have different natural resonant frequencies. Multiple discrete probe drive frequencies or a continuously swept sine wave probe drive are used to generate sound at multiple frequencies to increase the probability of finding any flaw in the part. A swept frequency probe drive transmits a plurality of sound waves at different frequencies. Common frequencies are between 10 kHz and 30 kHz, but other frequencies are also used. The probe drive frequency can be swept up or down.

Since the piezoelectric crystals in the pitch-catch probe generate and detect sound with different efficiency at different frequencies, a problem with swept frequency probes is that the appropriate instrument gain setting changes with frequency. When the gain is set to keep the high frequency signals on the screen of an associated display, the low frequency signals can no longer be seen, and appear as an almost flat trace (see FIGS. 4 and 5). In other cases, the converse may be true. Accordingly, the usefulness of the swept frequency probe drive on a pitch-catch bond tester is limited because the appropriate instrument gain setting varies with frequency. Since the gain may be set to keep high (or low) frequency signals on the screen, the low (or high) frequency signals cannot be seen even though they often have a higher signal-to-noise ratio. Consequently, there is a need for a non-destructive testing system and method that overcomes the shortcomings of such devices.

SUMMARY

The disclosure is directed to a method and system for non-destructive testing of composites that overcomes the disadvantages of systems that apply a single gain setting across a swept frequency and as a result may fail to produce easy to identify defect indications at one or more frequencies of the swept frequency probe. In one embodiment, a system for non-destructive testing of a composite includes a emitter that transmits sound signals to a test area of the composite, receives sound signals from the test area in response to the transmitted sound signals, and generates electric signals in response to the received signals; a computer control in communication with the emitter to receive the electric signals from the emitter, wherein the computer control is programmed to cause the emitter to transmit a plurality of the sound signals to the test area at a plurality of different frequencies over a range of frequencies; a display for displaying a graph of the received sound signals showing a received signal amplitude for the plurality of different frequencies of the range of frequencies; and the computer control programmed to apply a different, preset gain setting to at least one of the plurality of frequencies for a selected display image such that the display image shows a plot of received signal amplitude for the plurality of frequencies that is at least partially flattened, so that the amplitude of the signal from material without defects is the same at all frequencies, and changes in the amplitude of the signal are visually perceptible on the display for all of the plurality of signals.

In another embodiment, a method for making a non-destructive testing system includes connecting a emitter that transmits sound signals to a test area of the composite, receives sound signals from the test area in response to the transmitted sound signals, and generates electric signals in response to the received signals, to a computer control, such that the computer control receives electric signals from the emitter; connecting the computer control to a display; and programming the computer control to cause the emitter to transmit a plurality of the sound signals to the test area at a plurality of different frequencies over a range of frequencies, display on the display a graph of the received sound signals showing a received signal amplitude for the plurality of different frequencies of the range of frequencies, and apply a different, preset gain setting to at least one of the plurality of frequencies for a selected display image on the display, such that the display image shows a plot of received signal amplitude for the plurality of frequencies that is at least partially flattened, so that the amplitude of the signal from material without defects is the same at all frequencies, and changes in the amplitude of the signal are visually perceptible on the display for all of the plurality of signals.

In yet another embodiment, a method of non-destructive testing of a composite includes transmitting sound signals from a emitter to a test area of the composite, receiving sound signals by the emitter from the test area in response to the transmitted sound signals; generating electric signals by the emitter in response to the received signals; receiving the electric signals from the emitter by a computer control, wherein the computer control is programmed to cause the emitter to transmit a plurality of the sound signals to the test area at a plurality of different frequencies over a range of frequencies; displaying on a display graph of the received sound signals showing a received signal amplitude for the plurality of different frequencies of the range of frequencies; and applying by the computer control a different, pre-set gain setting to at least one of the plurality of frequencies for a selected display image such that the display image shows a plot of received signal amplitude for the plurality of frequencies that is at least partially flattened, so that the amplitude of the signal from material without defects is the same at all frequencies, and changes in the amplitude of the signal are visually perceptible on the display for all of the plurality of signals.

Other objects and advantages of the disclosed method and system for non-destructive testing of composites will be apparent from the following description, the accompanying drawings, and the appended claims.

BRIEF DESCRIPTION OF THE DRAWINGS

FIG. 8 is a flow chart showing a method of making the system for non-destructive testing of composites; and FIG. 9 is a flow chart showing a method of using the system for non-destructive testing of composites.

DETAILED DESCRIPTION

Figure 1:
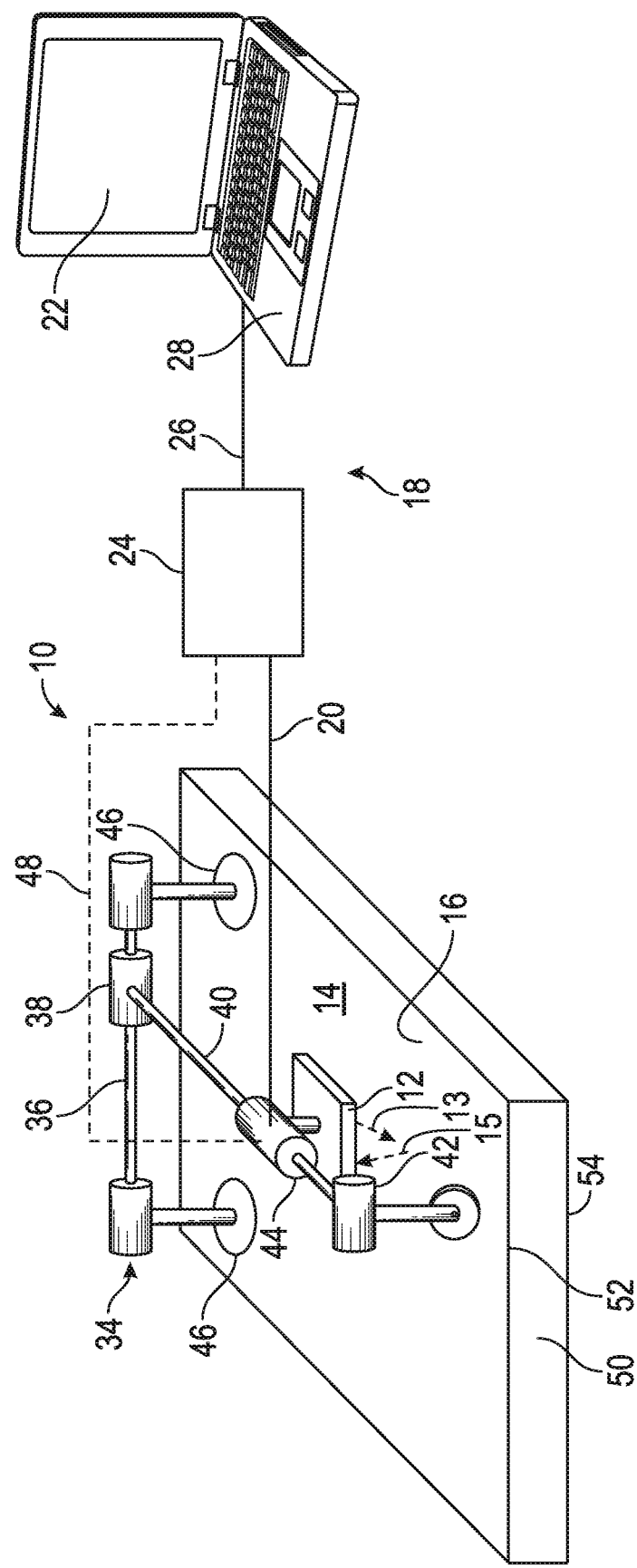
FIG. 1 is a schematic, perspective view of an embodiment of the system for non-destructive testing of composites.

An embodiment of the disclosed system for non-destructive testing of composites, generally designated 10, is shown in FIG. 1. The system 10 may include a probe or an emitter 12 that transmits sound (which may include sonic and/or ultrasonic sound) signals 13 to a test area 14 of a composite 16, receives sound signals 15 from the test area in response to the transmitted sound signals, and generates electric signals in response to the received signals. The system 10 also may include a computer control, generally designated 18, in communication with the emitter 12. The communication may take the form of a cable 20 between the computer control 18 and the emitter 12 to receive the electric signals from the emitter, wherein the computer control may be programmed to cause the emitter to transmit a plurality of the sound signals 13 to the test area 14 at a plurality of different frequencies over a range of frequencies. In other embodiments, the communication connections may take the form of wireless connections 20, including radio frequency, Wi-Fi, Bluetooth, infrared, and optical connections. The computer control 18 may include a display 22 for displaying a plot 32 (see FIG. 6) of the received sound signals showing a received signal amplitude for the plurality of different frequencies of the range of frequencies.

In an embodiment, the computer control 18 may include an electronics chassis 24 that is connected by a cable 26 to a laptop computer 28. As will be explained in greater detail, the computer control 18 may be programmed to apply a different, preset gain setting to at least one of the plurality of frequencies for selected display image 30 (FIGS. 6 and 7) such that the display image shows a plot 32 of received signal amplitude for the plurality of frequencies that is at least partially flattened to make the selected display image show more easy to identify flaw signals at any frequency. The computer control 18 may be programmed to apply a different, preset gain setting to at least one of the plurality of frequencies for a selected display image 30 such that the display image shows the plot 32 of received signal amplitude for the plurality of frequencies that is at least partially flattened, so that the amplitude of the signal from material without defects is the same at all frequencies, and changes in the amplitude of the signal are visually perceptible on the display 22 for all of the plurality of signals.

In an embodiment, the system 10 may include an automated system, such as the AUSS Mobile automated system manufactured by The Boeing Company of St. Louis, Mo. The emitter 12 may be a pitch-catch emitter and may be mounted on an X-Y scanning frame, generally designated 34. The X-Y scanning frame may include a longitudinal rail 36 that supports a sliding collar 38 connected to a transverse rail 40 that is supported at an opposite end by a wheel assembly 42. The emitter 12 may be mounted on a sliding collar 44 that slides along the transverse rail 40. The longitudinal rail 36 may be attached to the composite material 16 by fixed attachments, such as suction cups 46. The position of the collar 44 may be transmitted by a cable 48 to the electronics chassis 24 of the computer control 18.

Alternatively, the emitter 12 may be attached to a small hand-held scanner, robot arm, robotic crawler, or other type of scanner.

The composite material 16 may have a honeycomb core 50 sandwiched between outer skins 52, 54 of composite material, such as CFRP, fiberglass, and the like. Alternatively, the honeycomb core 50 may be sandwiched between outer skins 52, 54 of aluminum. Alternatively, the sandwich structure may use foam or wood as a material for the core 50, instead of honeycomb.

Figure 2:
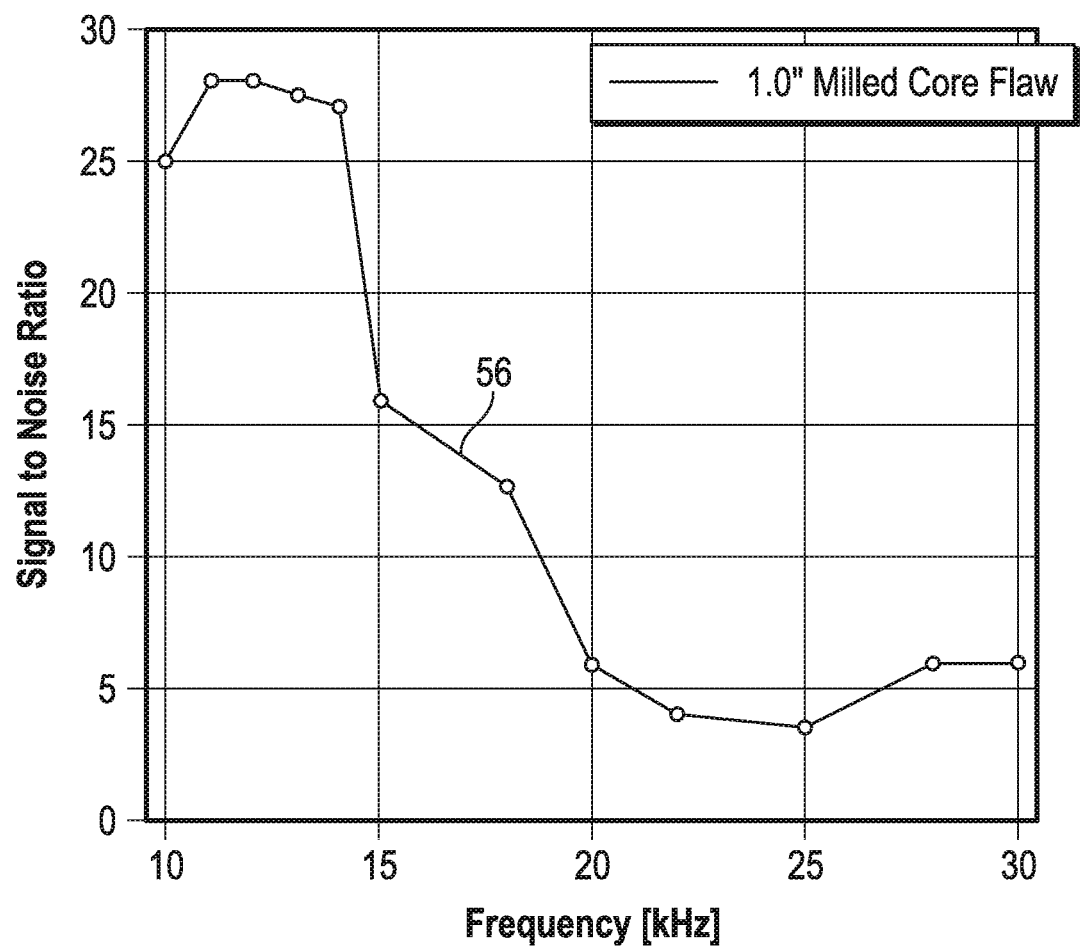
FIG. 2 is a graph of signal-to-noise ratio plotted against frequency of a pitch-catch probe of a type used in the system of FIG. 1.

FIG. 2 shows a plot 56 of signal-to-noise ratio versus frequency for a pitch-catch bond tester flaw response on a 1.0 inch diameter disbond in a sample piece of honeycomb structure. As can be seen from the plot 56, the signal-to-noise ratio is greatest in this case at relatively low frequencies, for example between 10 kHz and 17 kHz. In contrast, the signal-to-noise ratio is relatively lower at higher frequencies, for example between 20 kHz and 30 kHz.

Figure 4:
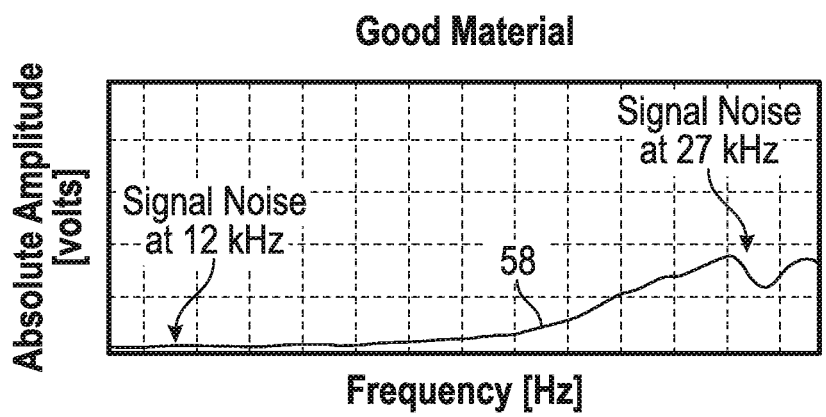
FIG. 4 is a prior art graph showing a plot of absolute amplitude in volts, of a received signal versus frequency in kilohertz of the received signal from material without a defect.
Figure 5:
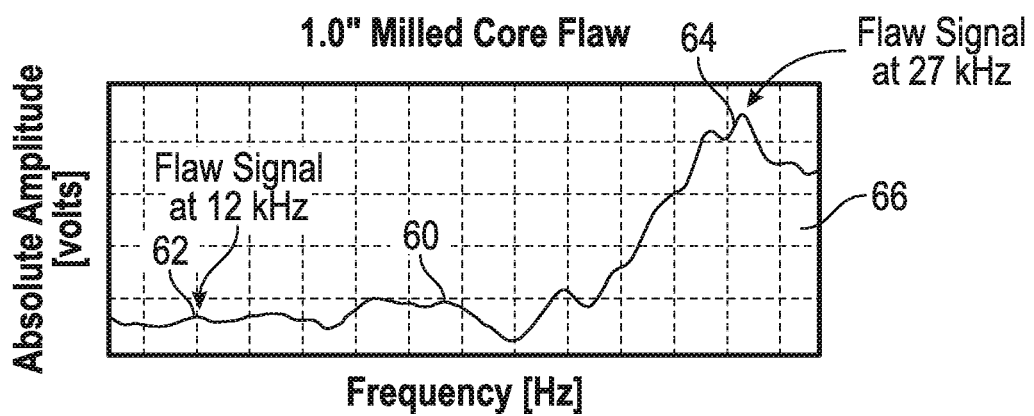
FIG. 5 is a prior art graph showing a plot of the prior art system in which absolute amplitude in volts is plotted against frequency in kilohertz for material having a flaw.

FIGS. 4 and 5 show plots 58, 60, respectively, generated by a prior art nondestructive testing device utilizing a pitch-catch probe, specifically, an Olympus S-PC-P14 Pitch-Catch Bond Tester Probe, scanning a honeycomb sandwich structure. In FIG. 4, a plot of absolute amplitude in volts of the received signal versus frequency in kilohertz is shown. The signal noise that occurs at around 27 kHz, shown graphically in FIG. 2., is apparent. This plot 58 is for "good material," namely, material without a flaw. The signal noise at around 12 kHz is relatively low and practically nonexistent.

As shown in FIG. 5, the plot 60 shows the same prior art system as for the plot 58 in FIG. 4 scanning a composite material with a defect in the form of a one-inch diameter disbond. A flaw signal occurs at approximately 12 kHz with a very high signal-to-noise ratio. Because of the much lower signal-to-noise ratio that occurs at 27 kHz (see FIG. 2), the 12 kHz flaw signal is difficult to see because it is necessary, with such a prior art system, to display with a low gain setting in order to keep the low signal-to-noise ratio flaw signal at 27 kHz, shown at 64, on the display screen 66.

Figure 3:
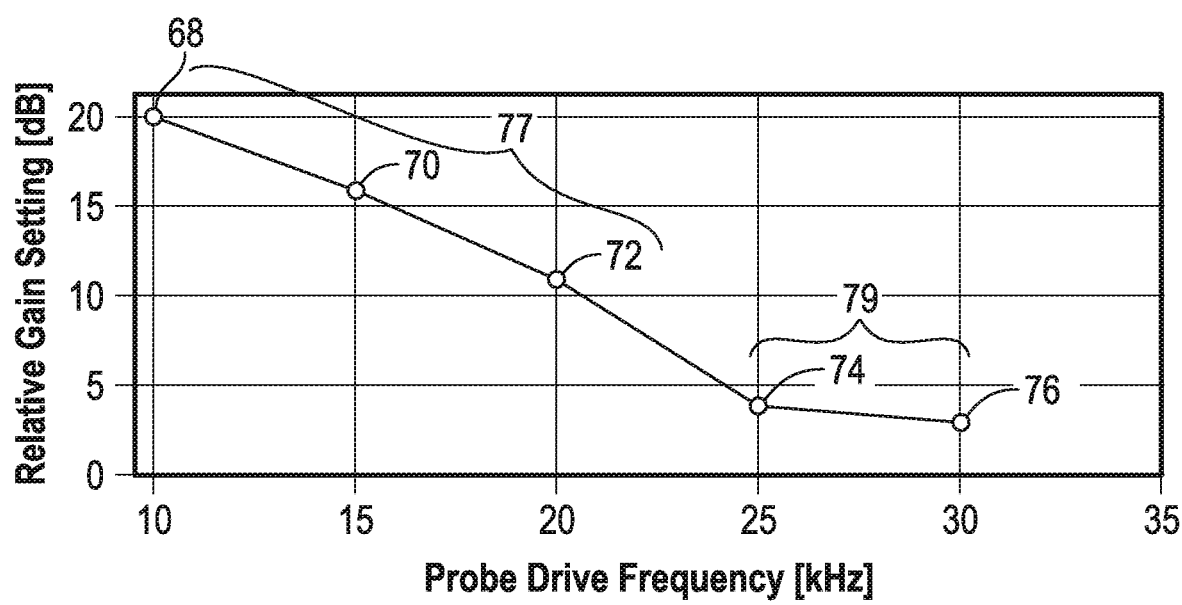
FIG. 3 is a graph showing a relative gain setting plotted versus probe drive frequency of the pitch-catch emitter of the system disclosed in FIG. 1.
Figure 6:
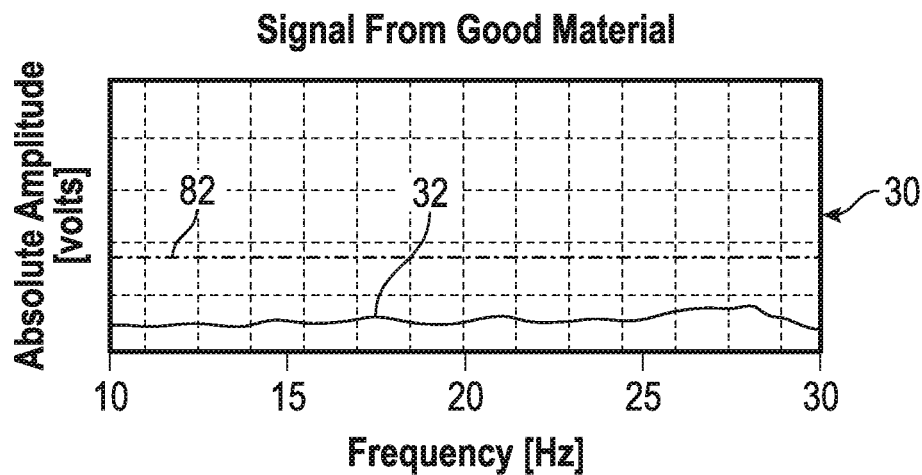
FIG. 6 is a graph showing a plot of absolute amplitude in volts versus frequency in kilohertz of the disclosed display system of FIG. 1, in which the disclosed system and process flatten the trace of the display for material without a defect.

FIG. 3 shows a plot of the probe drive frequencies of the disclosed system 10 of FIG. 1, and the gain setting at each frequency for viewing the signal easily on the instrument screen 22. The relative gain setting may be programmed into the computer control 18 and in embodiments, may be programmed into the operating logic of laptop 28, and applied to the plot 32 on display 30 of the received signal from the emitter 12 (FIG. 6). The computer control 18 may be programmed to provide a swept frequency comprising frequencies of, for example, 10, 15, 20, 25 and 30 kHz to be transmitted by the pitch-catch emitter 12 of the system 10. The computer control 18 may be programmed to assign a relative gain setting of 20 dB for the emitter 12 drive frequency of 10 kHz, indicated at 68, a gain setting of about 16 dB for 15 kHz, indicated at 70, a gain setting of approximately 11 dB, indicated at 72 for a 20 kHz transmitted signal, a gain setting of approximately 4 dB, indicated at 74, for 25 kHz, and a gain setting of approximately 3 dB, indicated at 76, for a transmitted frequency of 30 kHz. The number of probe drive frequencies and frequency specific gain settings may be more or less than the number in this example.

These gain settings 68-76 comprise different, pre-set gain settings that are applied to the frequencies received from the emitter 12 and displayed on display 22 to form the plot 32 (FIG. 6). The gain settings may be applied in real time as the plot 32 is shows the display 30 taken by emitter 12.

In this embodiment, the computer control 18 may be programmed to apply a relatively larger gain setting to at least one frequency in a first group 77 of the plurality of frequencies, and a relatively smaller gain setting to at least one frequency in a second group 79 of the plurality of frequencies. As shown in FIG. 3, the relatively larger gain may be the 20 dB gain, indicated at 68, to the first group 77 of the plurality of frequencies, and the relatively smaller gain setting, which may be about 3 dB and indicated at 76, to the second group 79 of the plurality of frequencies. In an embodiment, the first group 77 of the plurality of frequencies may be 10 kHz, 15 kHz and 20 kHz, and the second group 79 of the plurality of frequencies may be 25 kHz and 30 kHz. Accordingly, the second group 79 of the plurality of frequencies may include higher frequencies than frequencies of the first group 77 of the plurality of frequencies.

In the particular embodiment depicted in FIG. 3, the computer control 18 may be programmed to apply a different gain setting to each frequency of the plurality of different frequencies, for example, to 10 kHz, 15 kHz, 20 kHz, 25 kHz, and 30 kHz. It is also apparent from the graph that the magnitude of the gain settings applied to the plurality of different frequencies may be selected or preset to vary inversely with the frequencies of the plurality of different frequencies. Accordingly, the magnitude of the gain setting for 10 kHz, 15 kHz and 20 kHz may be greater than the gain settings for the larger frequencies of 25 kHz and 30 kHz. For some probes or emitters 12, this relationship between gain settings and frequency may be reversed, such that low gain settings are applied to low frequencies and high gain settings applied to high frequencies. For still other probes or emitters 12, the relationship between gain settings and frequency may be high for low frequencies, low for middle frequencies, and high for high frequencies, or other pairings of gain settings to frequencies.

As shown in FIG. 6, by applying the relative gain settings, for example the gain settings shown in FIG. 3, to each of the frequencies of the swept frequency probe 12 of FIG. 1, the plot 32 may be generated. This plot 32 is in the form of a relatively flat line, which signifies an absence of detects in the test area 14 of the composite 16. This flat line plot 32, which reflects the inputs of the different gain settings of, for example FIG. 3, makes it easier to detect flaws, which would appear as deviations from the flat line of the plot 32.

Figure 7:
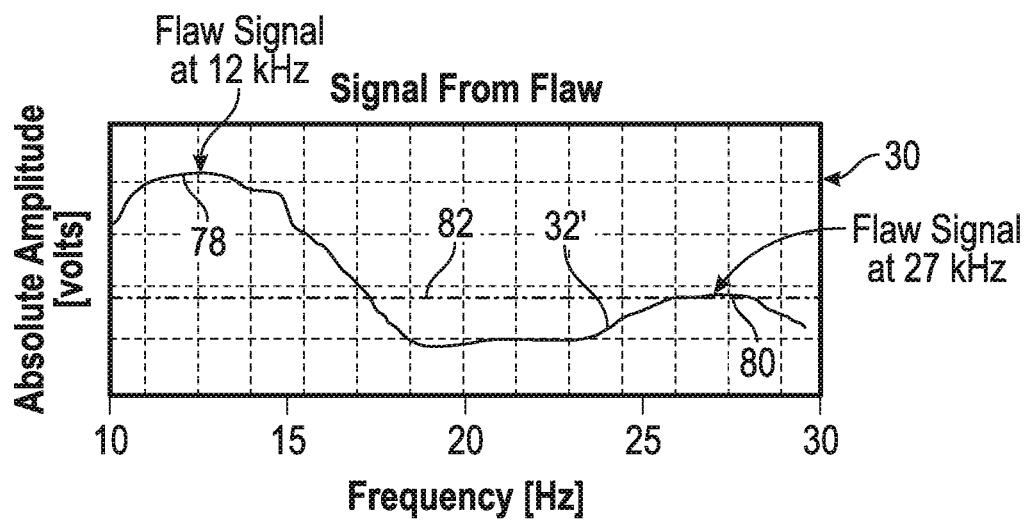
FIG. 7 is a graph showing a plot of absolute amplitude in volts versus frequency in kilohertz of the disclosed display system of FIG. 1, in which the disclosed system and process show a flaw signal in material.

As shown in FIG. 7, the plot 32' shows a flaw signal at 78, namely, an increase in absolute amplitude at approximately 12 kHz, which may be as pronounced, or approximately as pronounced, as a flaw signal 80 shown at approximately 2.7 kHz. Thus, by adjusting the gain assigned to each frequency as it is displayed on the display 30, the plot 32, 32' may be flattened relative to the plots generated by prior art devices, shown for example in FIGS. 4 and 5, for similar flaws. This adjustment of gain settings makes a flaw easier to spot, and thus more visually perceptible, regardless of the frequency at which it appears, because the flaw is manifested as a deviation from a flat, or substantially flat, line or plot 32.

Also in an embodiment, by flattening the plot 32, 32', the display 30 may include a line 82 at a predetermined amplitude that may serve as an alarm threshold for identifying flaws, or as a gate for mapping flaws in a C-scan collected by an automated system. Such an automated system may require the computer control 18 to be programmed to recognize absolute amplitudes that exceed the line 82, note the location on the test area 14 and type of defect, and store the data in storage associated with, or in communication with, the computer control.

As shown in FIG. 8, a method for making the non-destructive testing system 10 shown in FIG. 1, generally designated 90, may begin as indicated in block 92 by connecting a probe or an emitter 12 that transmits sound signals 13 to a test area 14 of a composite 16, receives sound signals 15 from the test area in response to the transmitted sound signals, and generates electronic signals in response to the received signals, to a computer control 18 such that the computer control receives electric signals from the emitter. As shown in block 94, the computer control 18 may be connected to a display 22, and as shown in block 96, the computer control 18 may be programmed to actuate the emitter 12, causing the emitter to transmit a plurality of the sound signals 13 to the test area 14 at a plurality of different frequencies (see FIG. 6) over a range of frequencies.

As shown in block 98, the computer control 18 may be programmed to display on the display 22 the image 30 of the plot 32 of the received sound signals 15 showing a received signal amplitude for the plurality of different frequencies of the range of frequencies. As shown in block 100, the computer control 18 may be programmed to apply a different, pre-set gain setting to at least one of the plurality of frequencies 68-76 for a selected display image 30 on the display 22 such that the display image shows a graph or plot 32 of received signal amplitude for the plurality of frequencies that is at least partially flattened to make the selected display image show more pronounced, visually perceptible, flaw signals.

In an embodiment, as shown in block 102, the computer control 18 optionally may be programmed to apply the different pre-sent gain setting in real time, as the image 30 of the plot 32 is displayed on the display 22. And as shown in block 104, the computer control 18 optionally may be programmed to apply a first gain setting 68 to at least one frequency in the first group 77 of the plurality of frequencies, and a second gain setting, less than the first gain setting, to at least one frequency 76 in the second group 79 of the plurality of frequencies 68-76.

As shown in block 106 and in FIG. 3, optionally, the computer control 18 may be programmed to apply a different gain setting to each frequency of the plurality of different frequencies 68-76. Such frequencies 68-76 may be arranged such that the magnitude of the gain settings applied to the plurality of different frequencies varies inversely with the frequencies of the plurality of different frequencies. In a preferred embodiment, the emitter 12 may take the form of a pitch-catch probe, and programming the computer control 18 may include loading a swept frequency probe drive into the computer control 18. The preferred embodiment 10 may take the form of a pitch-catch bond tester of a type that is depicted in FIG. 1.

As shown in FIG. 9, the disclosure also may include a method of non-destructive testing of the composite 16 (FIG. 1), generally designated 204. The method 204 may include transmitting sound signals 13 from the emitter 12 to a test area 14 of the composite 16, and receiving sound signals 15 by the emitter from the test area in response to the transmitted sound signals, as shown in block 206. As shown in block 208, the emitter 12 may generate electric signals in response to the received signals, which may be received by the computer control 18.

The probe or emitter 12 may be driven with a sinusoidal wave of continuously varying frequency, or it may be driven at multiple discrete frequencies. With the multiple discrete frequency approach, the computer control 18 may be programmed to drive the probe or emitter 12 at one selected frequency for a time interval, then switch to the next frequency in the range 77, 79 for a second, subsequent time interval, and so on in successive time intervals for all of the selected frequencies 68-76. The rate at which the probe or emitter 12 switches through the selected frequencies 68-76 may be very rapid compared to (i.e., is greater than) the speed at which the emitter 12 moves over the test area 14 of the composite 16.

As shown in block 210, the computer control 18 may be programmed to cause the emitter 12 to transmit a plurality of the sound signals to the test area 14 at a plurality of different frequencies over a range of frequencies. As shown in block 212, the method 204 may include displaying on a graph 30 that may include a plot 32 of the received sound signals 15 showing a received signal amplitude for the plurality of different frequencies 68-76 of the range of frequencies. The computer control 18 may be programmed to apply a different, pre-set gain setting to at least one of the plurality of different frequencies 68-76 for a selected display image 30 on the display 22, such that the display image 30 shows a plot 32 of received signal amplitude for the plurality of different frequencies 68-76 that is at least partially flattened.

The amplitude of the signal 15 from material 16 without defects is the same at all frequencies, as shown in FIG. 6. Changes in the amplitude of the signal are visually perceptible on the display 22 for all of the plurality of signals. For example, the display image 30 may show a plot of received signal amplitude for the plurality of frequencies 68-76 that is at least partially flattened to make the selected display image show more pronounced or more visibly perceptible flaw signals 78, 80 (FIG. 7). Flaw signals at both low and high frequencies 78, 80 for 12 kHz and 27 kHz, respectively, are visually perceptible on plot 32', in contrast to the flaw signal at 62 for 12 kHz in FIG. 5, for example, which is not visually perceptible.

As illustrated in the accompanying drawings and discussed herein, the disclosed system 10 and methods 90, 204 solve the problem of keeping high frequency signals on a display screen 22 across a swept frequency display 30 by applying a different gain setting to different frequencies as they are displayed. By applying different gain settings, in one embodiment such that the amount of gain setting varies inversely with the frequency, the plot 32, 32' shown on the display 22 is flattened and allows flaws to be detected at any frequency across the swept frequency range of the probe or emitter 12.

While the forms of apparatus and methods described herein constitute preferred embodiments of the disclosed method and system for non-destructive testing of composites, it is to be understood that the disclosure is not limited to these specific embodiments, and that changes may be made therein without departing from the scope of the disclosure.

What is claimed is:

1. A system (10) for nondestructive testing of a composite, the system comprising:

an emitter (12) that transmits sound signals (13) to a test area (14) of the composite (16), receives sound signals (15) from the test area in response to the transmitted sound signals, and generates electric signals in response to the received signals;

a computer control (18) in communication with the emitter to receive the electric signals from the emitter, wherein the computer control is programmed to cause the emitter to transmit a plurality of the sound signals (13) to the test area at a plurality of different frequencies over a range of frequencies;

a display (22) for displaying a graph of the received sound signals showing a received signal amplitude for each of the plurality of different frequencies of the range of frequencies; and the computer control programmed to:

determine each of the plurality of different frequencies to be transmitted by the emitter, assign a predetermined gain setting for each of the determined plurality of different frequencies to be transmitted by the emitter;

apply a different, preset gain setting (68-76) to each of the determined plurality of different frequencies for a selected display image (30), and display a plot of received signal amplitude (32) for the plurality of different frequencies that is at least partially flattened, so that the amplitude of the signal from material without defects is the same at all frequencies, and changes in the amplitude of the signal are visually perceptible on the display for all of the plurality of signals.

2. The system of claim 1, wherein the computer control is programmed to apply the different, preset gain setting in real time.

3. The system of claim 1, wherein the computer control is programmed to apply a first gain setting (68) to at least one frequency in a first group (77) of the plurality of frequencies, and a second gain setting (76), less than the first gain setting, to at least one frequency in a second group (79) of the plurality of frequencies.

4. The system of claim 3, wherein the second group of the plurality of frequencies includes higher frequencies than frequencies of the first group of the plurality of frequencies.

5. The system of claim 4, wherein the computer control is programmed to apply a different gain setting to each frequency of the plurality of different frequencies.

6. The system of claim 5, wherein a magnitude of the gain settings applied to the plurality of different frequencies varies inversely with the frequencies of the plurality of different frequencies.

7. The system of claim 1, wherein the emitter (12) is a pitch-catch probe.

8. The system of claim 7, wherein the computer control includes (18) a swept frequency probe drive.

9. The system of claim 1, wherein the system (10) is a pitch-catch bond tester.

10. The system of claim 1, wherein the display is incorporated in a laptop computer (28).

11. A method (90) for making a non-destructive testing system (10), the method comprising:

connecting (92) an emitter (12) that transmits sound signals (13) to a test area (14) of a composite (16), receives sound signals (15) from the test area in response to the transmitted sound signals, and generates electric signals in response to the received signals, to a computer control (18), such that the computer control receives electric signals from the emitter;

connecting (94) the computer control to a display (22); and programming (96, 98, 100) the computer control to cause the emitter to transmit a plurality of the sound signals to the test area at a plurality of different frequencies over a range of frequencies, display on the display a graph of the received sound signals showing a received signal amplitude for each of the plurality of different frequencies of the range of frequencies, determine each of the plurality of different frequencies to be transmitted by the emitter, assign a predetermined gain setting to each of the determined plurality of the different frequencies to be transmitted by the emitter;

apply a different, preset gain setting to at least two of the determined plurality of frequencies for a selected display image on the display, and display a plot of received signal amplitude for the plurality of different frequencies that is at least partially flattened, so that the amplitude of the signal from material without defects is the same at all frequencies, and changes in the amplitude of the signal are visually perceptible on the display for all of the plurality of signals.

12. The method of claim 11, wherein programming the computer control includes programming the computer control to apply the different, preset gain setting in real time (102).

13. The method of claim 11, wherein programming the computer control includes applying (104) a first gain setting to at least one frequency in a first group of the plurality of frequencies, and a second gain setting, less than the first gain setting, to at least one frequency in a second group of the plurality of frequencies.

14. The method of claim 13, wherein programming the computer control includes applying (104) a first gain setting to at least one frequency in the first group of the plurality of frequencies, and a second gain setting, less than the first gain setting, to at least one frequency in the second group of the plurality of frequencies, wherein the second group of the plurality of frequencies includes higher frequencies than frequencies of the first group of the plurality of frequencies.

15. The method of claim 14, wherein programming the computer control includes applying (106) a different gain setting to each frequency of the plurality of different frequencies.

16. The method of claim 15, wherein programming the computer control includes applying (100) a magnitude of the gain settings to the plurality of different frequencies that varies inversely with the frequencies of the plurality of different frequencies.

17. The method of claim 11, wherein connecting the emitter (92) includes connecting a pitch-catch probe.

18. The method of claim 17, wherein the programming the computer control (96) includes loading a swept frequency probe drive into the computer control.

19. The method of claim 11, wherein connecting the emitter to the computer control (92) forms a pitch-catch bond tester.

20. A method of nondestructive testing of a composite (204), the method comprising:

transmitting (206) sound signals from a emitter to a test area of the composite;

receiving (206) sound signals by the emitter from the test area in response to the transmitted sound signals;

generating (208) electric signals by the emitter in response to the received signals;

receiving (208) the electric signals from the emitter by a computer control, wherein the computer control is programmed (210) to cause the emitter to transmit a plurality of the sound signals to the test area at a plurality of different frequencies over a range of frequencies;

displaying (212) on a display a graph of the received sound signals showing a received signal amplitude for each of the plurality of different frequencies of the range of frequencies;

selecting a different preset gain setting based on the frequency of each of the plurality of the different frequencies; and applying (212) by the computer control the different preset gain setting to each of the plurality of the different frequencies of the range of frequencies, including applying the different, preset gain setting to at least three of the plurality of frequencies for a selected display image on the display, such that the display image shows a plot of received signal amplitude for the plurality of frequencies that is at least partially flattened, so that the amplitude of the signal from material without defects is the same at all frequencies, and changes in the amplitude of the signal are visually perceptible on the display for all of the plurality of signals.

\* \* \* \* \*